United States Patent [19]

Hunt

[11] 4,205,655
[45] Jun. 3, 1980

[54] SOLAR COLLECTOR

[75] Inventor: Floyd P. Hunt, Painted Post, N.Y.

[73] Assignee: Corning Glass Works, Corning, N.Y.

[21] Appl. No.: 879,875

[22] Filed: Feb. 22, 1978

[51] Int. Cl.² .................................................. F24J 3/02
[52] U.S. Cl. .................................................... 126/443
[58] Field of Search .................. 126/271, 270; 138/113

[56] References Cited

U.S. PATENT DOCUMENTS

| 2,915,089 | 12/1959 | Horsting, Sr. | 138/113 |
| 3,467,143 | 9/1969 | Croft | 138/113 |
| 4,080,954 | 3/1978 | Wilde et al. | 126/270 |
| 4,124,019 | 11/1978 | Heffelfinger | 126/271 |
| 4,134,388 | 1/1979 | Kersten et al. | 126/270 |

Primary Examiner—Albert W. Davis
Assistant Examiner—Wesley S. Ratliff, Jr.

Attorney, Agent, or Firm—Burton R. Turner; John P. DeLuca

[57] ABSTRACT

In an evacuated solar collector of the type having an inner absorber member and an outer tubular envelope surrounding the absorber, the space surrounding the absorber being evacuated, the improvement comprising an expansion joint slidably coupling the absorber and the outer tubular member, including first and second sleevable portions being respectively formed to the absorber and the outer tubular member. The sleevable portions are sleeved, one within the other, concentrically forming an angular space therebetween, and a resilient member, disposed in the annular space, slidably supports the absorber member within the outer tubular member in a generally concentric or coaxial manner for allowing the expansion and contraction of the absorber relative to the outer tubular member.

8 Claims, 7 Drawing Figures

SOLAR COLLECTOR

BACKGROUND OF INVENTION

This invention relates to evacuated tubular solar collectors and more particularly to a type wherein an outer tubular member surrounds an inner absorber member, and wherein the absorber member may move relative to the outer tubular member. The outer tubular member is closed to ambience and is evacuated while the absorber member is adapted to carry working fluid for the removal of sensible heat produced as a result of insolation. The improvement provides for a slidable coupling so that the outer tubular member may move relative to the absorber member upon expansion and contraction thereof under varying conditions of insolation, and for supporting the absorber member within the outer tubular member along a selected axis.

Evacuated tubular solar collectors of the type described herein utilize clips for centering and supporting an absorber within an outer tubular member. Such clips may take the form of extensions of the absorber surface which are of minimal surface area and which physically touch the outer tubular member. Stampings or spring-like members may also be utilized to engage with the absorber and the inner wall of the outer tubular member to support one relative to the other and to allow for a certain amount of expansion of the absorber under insolation. It is also known to utilize insulating buttons or the like for supporting the absorber member within the outer tubular member.

Of the systems described above it is oftentimes difficult, expensive, and inefficient to provide optimal support. One reason for this is that the clips or springs are usually manufactured from metals which are highly conductive and produce thermal leaks from the absorber to the outer surface of the outer tubular member. Insulating buttons may be more desirable, however, they must be fixed about the circumference of the collector in the evacuated space more or less at even angular spacing. In any event they are sometimes difficult to insert in a manner adapted for rapid fabrication.

The present invention, on the other hand, utilizes a preformed outer tubular member having a sleevable portion and a preformed inner absorber member, which may be in the form of a member having a portion which engages with the preformed portion of the outer tubular member to form a sleevable or sleeved expansion joint. Means may be provided to cushion the inner and outer members one from the other, which means may be a spring-like member concentrically disposed in the sleeved expansion joint to support the absorber relative to the outer tubular member. The spring-like member is fabricated with minimal surface contact in the expansion joint for significantly reducing thermal leaks. The cushion means may be in the form of an insulator to further reduce thermal loss.

The present invention also provides for ease of fabrication since the outer tubular member and the absorber member are preformed, each carrying a portion of the expansion joint, and preassembled with the cushion means to reduce the final fabrication time.

SUMMARY OF INVENTION

An evacuated tubular solar collector comprising, an outer tubular member and an inner absorber member surrounded and substantially enclosed in an evacuated space established by said outer tubular member, the improvement comprising: an expansion joint for allowing the absorber member to expand and contract with respect to the outer tubular member including; first and second sleevable portions being respectively formed in respective free ends of the absorber member and the outer tubular member, said first and second sleevable portions being generally concentrically sleeved one within the other forming an annular space therebetween, and resilient means disposed in said annular space for resilientally supporting the free end of the absorber member relative to the free end of the outer tubular member.

DESCRIPTION OF THE PREFERRED EMBODIMENTS

Figure 1:
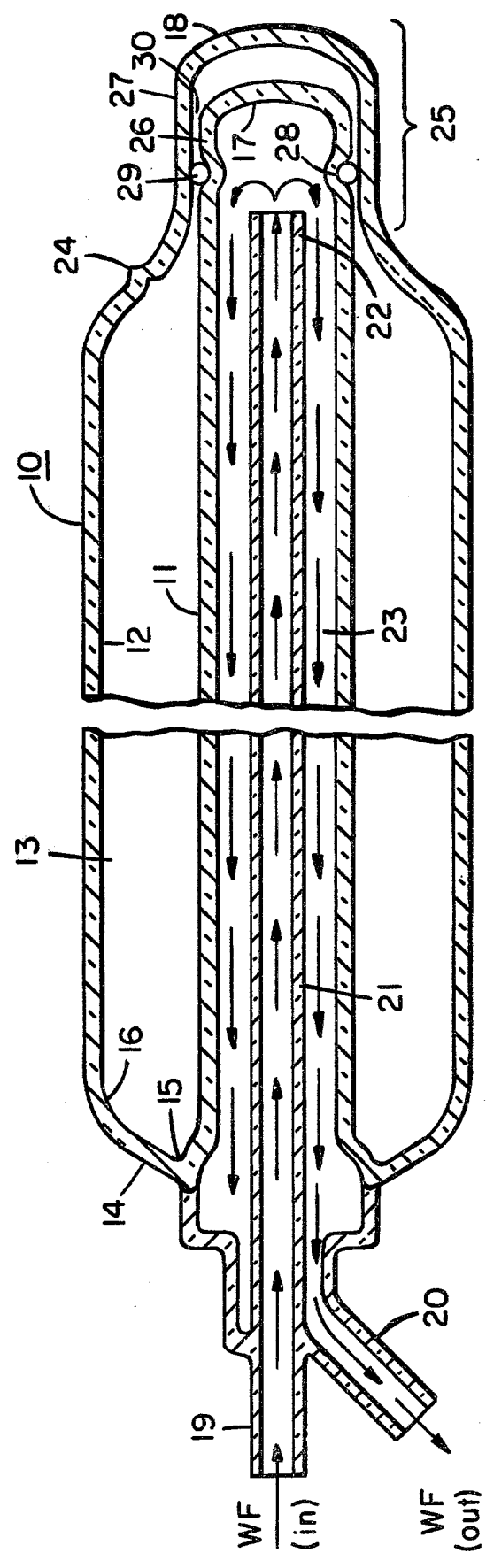
FIG. 1 is a side cross-sectional view of an improved solar collector utilizing the principles of the present invention wherein a formed end of the outer tubular member receives a free end of the absorber.

In FIG. 1 there is illustrated an evacuated tubular solar collector 10 of the type wherein an inner tubular member 11, sometimes referred to as absorber member, is surrounded by an outer tubular member 12. Each are joined together at respective closed ends 15–16 at seal 14 so as to establish an annular space 13 therebetween. A free end of the inner tubular member 11 is closed at 17, and likewise a free end of the outer tubular member 12 is closed at 18. (To the right in the drawing). The seal 14 closes the outer tubular member 12 to ambience and essentially centers the respective inner and outer tubular members 11-12 one within the other. It should be further pointed out that the space 13 between the tubes is evacuated through a tipoff 24 by suitable evacuation means and tipoff 24 is sealed according to known expedients. The evacuated space 13 naturally reduces convection losses from the surface of the absorber member 11 to render the collector 10 more efficient.

There is also provided, means for introducing a working fluid WF into the inner tubular member 11. Inlet port 19 receives working fluid WF and is coupled to a fluid delivery tube 21 which tube carries the working fluid WF from left to right in the drawing towards the closed end 17 of the inner tubular member 11. The working fluid WF circulates from outlet 22 of fluid delivery tube 21 to an angular space 23 between the fluid delivery tube 21 and the inner portion of the inner tubular member 11. This annular space 23 is in communication with fluid outlet port 20, and a circulation path for working fluid WF is thereby established.

The inner tubular member 11 may be coated with a selective absorber of various types known in the art for absorbing solar insolation and transferring same through the walls of the tubular member 11 to the working fluid WF. Upon insolation by solar radiation, the inner tubular member 11 becomes relatively hot with respect to the outer tubular member and expands relative thereto.

In prior art schemes there are means provided for supporting the respective free ends 17 and 18 of the inner and outer tubular means 11-12 with respect to one another which means include springs, clips and the like. However the present invention seeks to center one tube within the other by use of a sleevable joint as is explained below.

Referring now to the improvement of the present invention, reference is directed toward the right end of the drawing of collector 10, wherein a portion of the inner tubular member 11 is slidably fit within a portion of the outer tubular member 12 in an expansion joint 25.

A relatively short sleevable portion 26 of the free end 17 of the inner tubular member 11 is slidably fit within a relatively short expansion portion 27 of the free end 18 of the outer tubular member 12. It should be appreciated that the respective inner and outer tubular members 11 and 12 may be preformed with the profile illustrated so that the outer diameter of the inner tubular member 11 fits within the inner diameter of the expansion portion 27 of the outer tubular member 12. For example outer tubular member 12 may be blown from tubing and formed with free end 18 closed and having outwardly projecting expansion portion 27. The inner tubular member 11 is also provided with a recess 28 which is in the form of an annular depression in the outer diameter thereof.

A helical spring or resilient member 29 is sleeved over the free end 17 of the inner tubular member 11 and disposed within the recess 28. It should be appreciated that there is a space 30 formed between the outer diameter of sleevable portion 26 of tube 11 and the inner diameter of the expansion portion 27 of the outer tubular member 12, which space 30 is large enough to accommodate the resilient member 29 as disposed in the recess 28. The resilient member 29 prevents abrasion of the tubular members 11 and 12 upon expansion and contraction thereof. It should be understood that while an insulating material might be used for resilient member 29 a steel helical spring is at present the most convenient material since it is readily available and the portion of the resilient member 29 which touches the expansion portion 27 of the outer tubular member is relatively small compared to the total surface area of the inner tubular member 11 and, while it may provide a thermal leak, such a leak is tolerable.

It should be readily understood that upon formation of the collector 10 inner tubular member 11 is independently formed with the recess 28 in sleevable portion 26 and the outer tubular member 12 is formed with the expansion portion 27. The two tubular members 11 and 12 may thereafter be fit one within the other and the seal 14 made simply and rather quickly in a manner known in the art. The placing of the resilient member 29 is accomplished prior to inserting one tubular member 11 into the other 12. There are therefore no loose parts which must be centered or adjusted upon insertion of one tubular member 11 into the other 12.

Figure 2:
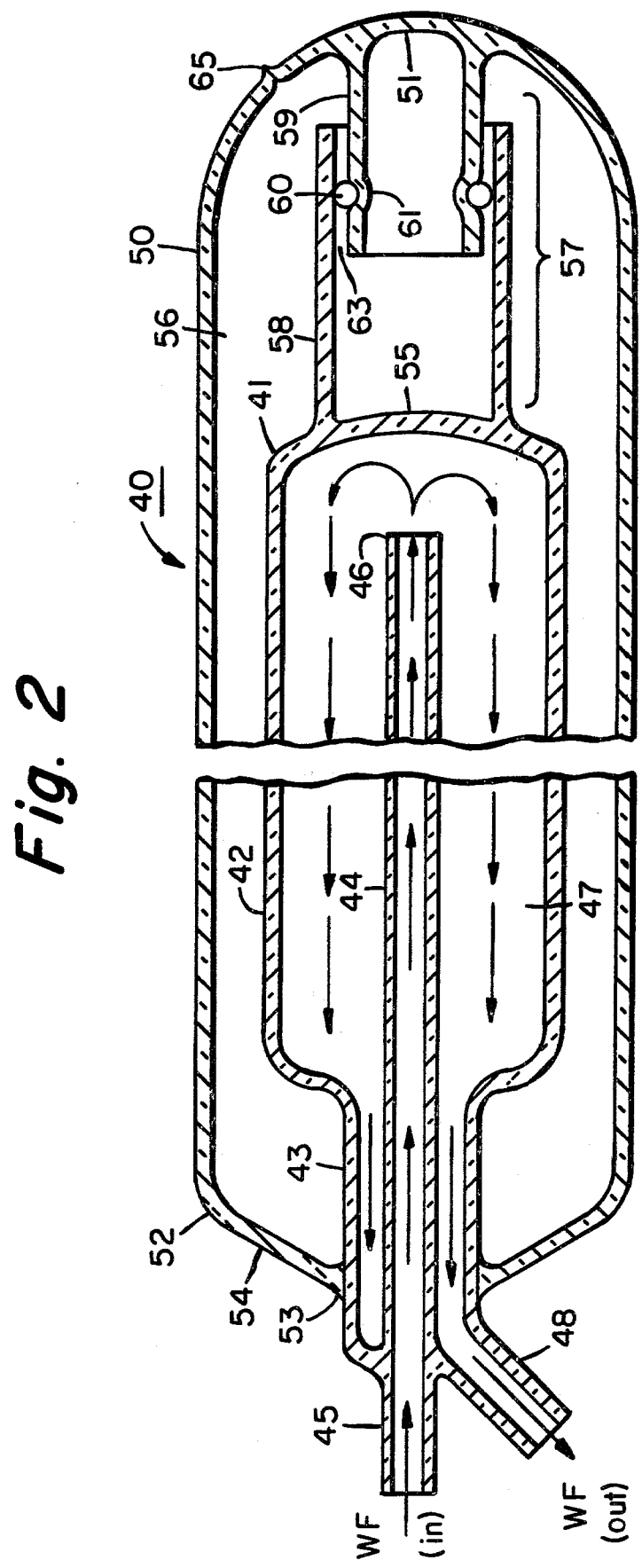
FIG. 2 is an alternative embodiment in cross section of an evacuated tubular solar collector utilizing another concept for the present invention wherein sleeve portions join the outer tubular member with the absorber within the evacuated space.

In another embodiment of the present invention, there is illustrated in FIG. 2, a solar collector 40 of the same general type described with respect to FIG. 1, however the configuration is slightly different. In this particular arrangement, an inner tubular member 41 takes the shape of a bulb-like structure having a bulb portion 42 and a stem portion 43. A fluid inlet tube 44 is provided which is in communication with fluid inlet port 45 wherein working fluid WF is introduced and passed therethrough to the right outlet end thereof at 46 where said working fluid circulates in an annular space 47 between the inlet tube 44 and inner tubular member 41, and passes through the stem portion 43 to the fluid outlet port 48 which provides a circulation path for the working fluid WF.

An outer tubular member 50 is provided, which is similarly formed as the tubular member 12 of FIG. 1, having a free end 51 which is closed to ambient and being joined at its other closed end 52 to a closed end 53 of the inner tubular member 41 by a seal 54. A free end 55 of the inner tubular member 41 is aligned axially with the free end 51 of the outer tubular member 50. An annular space 56 is formed between the respective inner and outer tubular members 41,50 and said space 56 is normally evacuated through the tipoff 65 as is known in the art.

Turning to the improvement of the present invention, there is provided in the embodiment illustrated in FIG. 2 a coupling member 57 which is formed as a first sleeve portion 58 of the inner tubular member 41, a second sleeve portion 59 of the outer tubular member 50 concentric with said first sleeve portion 58, and a resilient member 60 is mounted therebetween. First sleeve portion 58 may be integrally formed with the closed end 55 of the inner tubular member 41 and second sleeve portion 59 may be integrally formed with free end 51 of outer tubular member 50. The second sleeve member 59 has a recess 61 formed therein which receives the resilient member 60. The resilient member 60 may be spring or resilient insulator as previously described.

The inner tubular member 41 may be coated with an absorber material as is known in the art. Heat energy produced by insolation causes the inner tubular member 41 to expand relative to the outer tubular member 50. The outer diameter of the second sleeve portion 59 is accommodated by the inner diameter of the first sleeve portion 58, leaving a space 63 therebetween which space can accommodate the insulating member 58 as it is disposed in the recess 61 and also for radial movement of portions of the coupling member 57.

Figure 3:
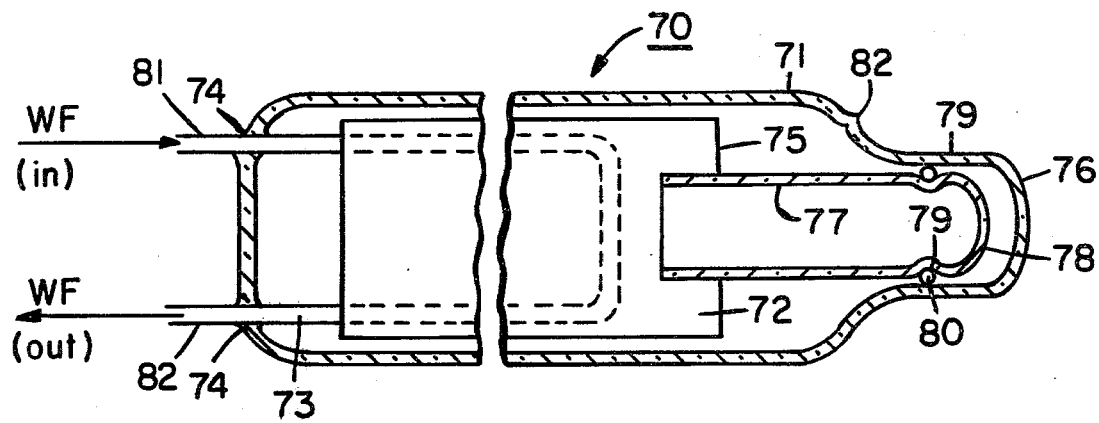
FIG. 3 is a fragmental cross-sectional view of another embodiment of the present invention similar to FIG. 1 but illustrating a flat plate absorber structure with a U-tube working fluid conduit.

It should be clear from the foregoing that other variations on the present invention are possible. For example, FIG. 3 illustrates an evacuated tubular collector 70 of the type having an outer tubular member 71 evacuated and sealed against ambience at tipoff 82, an absorber 72 of the flat plate type disposed therein and a U-tube 73 welded to the absorber 72. The U-tube 73 is formed through the walls of the outer tubular member 71 by glass-to-metal seals 74 for respective working fluid WF inlet and outlet ports 81 and 82.

A free end 75 of the absorber 72 is axially aligned with a free end 76 of the outer tubular member 71. Cylindrical expansion joint 77 is attached to free end 75 of absorber 72 and a free end thereof 78 is disposed in formed portion 79 of the free end of outer tubular member 71. The arrangement is similar to that illustrated in FIG. 1. The cylindrical expansion joint 77 of absorber 72 could be a formed stamping. Recess 79 receives cushion means 80 therein for the purpose previously described.

Figure 4:
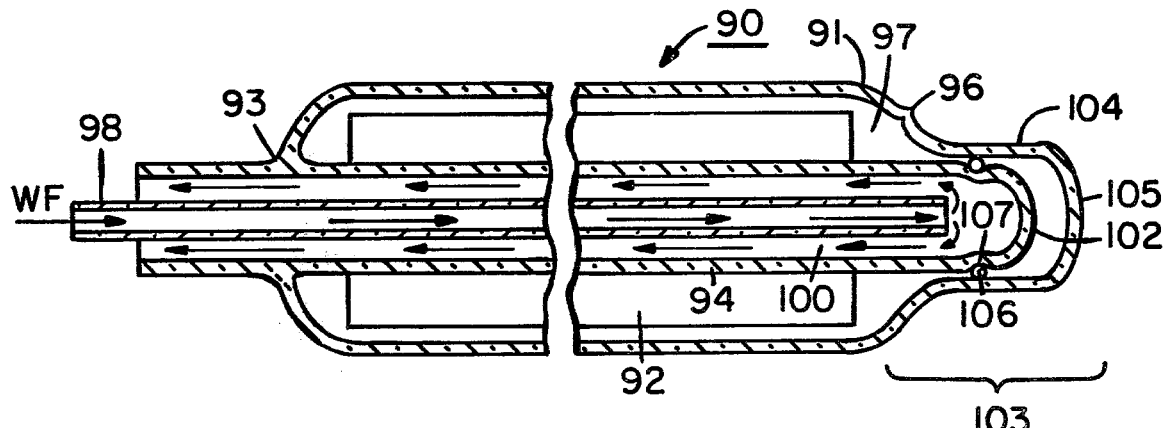
FIG. 4 is a fragmental cross-sectional view of yet another embodiment of the present invention for a flat plate absorber and counter flow working fluid conduit.

In FIG. 4 there is illustrated an evacuated tubular solar collector 90, having a transparent outer tubular member 91, an inner absorber member 92 welded to an inner tubular member or fluid counter flow pipe 94. Fluid pipe 94 is coupled to outer tubular member 91 by glass-to-metal. A space 97 within the outer tubular member 91 is evacuated by tipoff 96. The absorber 92 may be coated with a selective coating as is known in the art to efficiently absorb and retain the energy of solar insolation. Fluid inlet pipe 98 receives working fluid WF and circulates same into annular space 100 between fluid inlet pipe 97 and counter flow pipe 94 as previously disclosed by similar structures herein.

As in the previous description, an expansion joint 103 is provided to support and allow for expansion of the absorber 92 relative to the outer tubular member 91. The expansion joint 103 includes a portion of the outer tubular member 91 having a formed sleevable portion 104, formed in free end 105 which receives the free end 102 of inner tubular member 94. A recess 107 receives resilient member 106 in a manner which has been previously described.

Various other type absorbers might be used for a solar collector, for example a heat pipe is well suited to be enclosed in an evacuated tubular envelope, one free end of which could be arranged as in FIG. 1 or FIG. 2. Such variations are contemplated by the present invention.

Figure 5A:
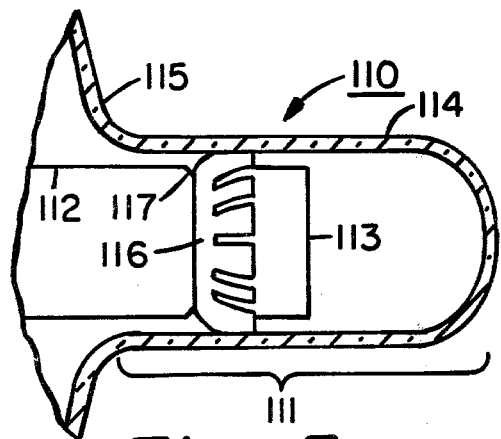
FIGS. 5A, B and C illustrate in detail an alternative embodiment of the resilient means of the present invention.

FIGS. 5A, B and C illustrate a variation on the resilient means of the present invention by detailing a portion of a solar collector 110 and expansion joint 111 therefor. An inner tubular member 112 has its free end 113 disposed in an expansion portion 114 of the outer tubular member 115. A resilient means 116 is disposed in a recess 117 of the inner tubular member 112. The resilient means 116 may be a stamped annular spring sleeved over the free end 113 of inner tubular member 112 into recess 117.

Figure 5B:
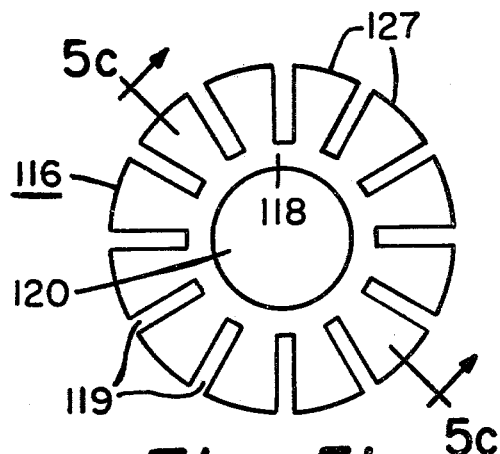
Figure 5C:
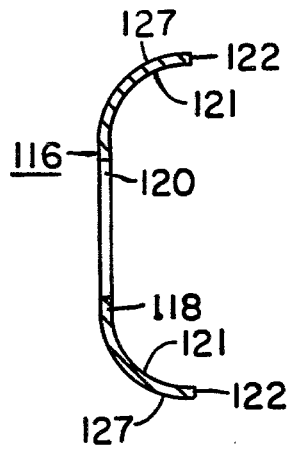

FIG. 5B illustrates the resilient means 116 in an end view wherein finned portions 127 are formed about a central annular portion 118 having a hole 120 therein for sleeving over the free end 113 of the tubular member 112 as described above. Slots 119 allow fins 127 to move relative to each other. In FIG. 5C a cross section of the cushion means 116 is illustrated taken along line 5C—5C of FIG. 5B. The drawing illustrates the curved profile of fins 127. Curved portions 121 may be sprung to the profile indicated to suitably support the tubular member 112 within the expansion portion 114 of the outer tubular member 115. The ends 122 of the fins 127 engage with the inner walls of the expansion portion 114 of the outer tubular member 115 as illustrated more clearly in FIG. 5A.

While there has been described what are presently considered to be the preferred embodiments of the present invention it will be obvious to those skilled in the art that various changes and modifications may be made therein without departing from the invention and it is intended in the appended claims to cover all such changes and modifications as come within the true spirit and scope of the invention.

What is claimed is:

1. In an evacuated tubular solar collector, an outer tubular member defining a space therein, an inner absorber member coupled at one end to the other tubular member and sealed therein, said absorber member being adapted to receive and absorb insolation and convert same to sensible heat, means coupled to the absorber member for providing an inlet and outlet for circulation of working fluid in heat exchange relation therewith, the space within the outer tubular member being evacuated to a selected partial pressure, the improvement comprising:

a relatively short length expansion joint for allowing the absorber member to expand and contract relative to the outer tubular member in response to varying solar insolation including; first and second sleevable portions being formed as respective reduced diameter projections extending from free ends of the inner absorber member and outer tubular member, said sleevable portions being generally sleeved one within the other forming an annular space therebetween, at least one of said first and second sleevable portions having a recess formed therein, and resilient means disposed securely in said recess for resiliently supporting the first and second sleevable portions relative to each other, said resilient means having a relatively small surface area in contact with the outer tubular member in order to minimize thermal heat loss.

2. The solar collector of claim 1 wherein said resilient means comprises a spring helically wound about a circular axis having free ends thereof joined to each other in the form of a loop.

3. The solar collector of claim 1 wherein the first and second sleevable portions respectively comprises: a first annular sleeve of selected length extending forward of the free end of the absorber member into said evacuated space towards the free end of the outer tubular member, and a second annular sleeve of selected length extending rearward of the free end of the outer tubular member towards the first annular sleeve and engaging therewith, the first and second annular sleeves being concentric with each other for a portion of their lengths.

4. The solar collector of claim 3 wherein said absorber member is a flat plate having a surface adapted to the oriented towards the sun and the means for introducing and removing the working fluid comprises a tubular member in communication with said absorber plate.

5. The solar collector of claim 4 wherein said first sleevable portion comprises a formed sleeve-like free end portion of the absorber plate sleeved in communication with the second sleevable portion of said outer tubular member.

6. The solar collector of claim 1 wherein said absorber member comprises a heat pipe a free end thereof engaged with the second sleevable portion of said outer tubular member.

7. The solar collector of claim 1 wherein the first and second sleevable portions are integrally formed with the respective absorber member and outer tubular member.

8. The solar collector of claim 1 wherein said recess is a formed annular groove in at least one of the first and second sleevable portions.

* * * * *

UNITED STATES PATENT AND TRADEMARK OFFICE
CERTIFICATE OF CORRECTION

PATENT NO. : 4,205,655
DATED : June 3, 1980
INVENTOR(S) : Floyd P. Hunt

It is certified that error appears in the above-identified patent and that said Letters Patent are hereby corrected as shown below:

Column 6, line 1, "other" should be changed to read --outer--.

Signed and Sealed this

Twenty-eighth Day of October 1980

[SEAL]

*Attest:*

SIDNEY A. DIAMOND

*Attesting Officer*  *Commissioner of Patents and Trademarks*